(12) United States Patent
Yung et al.

(10) Patent No.: US 11,930,356 B2
(45) Date of Patent: *Mar. 12, 2024

(54) THREE-PARTY CRYPTOGRAPHIC HANDSHAKE PROTOCOL

(71) Applicant: Google LLC, Mountain View, CA (US)

(72) Inventors: Marcel M. M. Yung, New York, NY (US); David Lazarov, Petah Tikva (IL)

(73) Assignee: Google LLC, Mountain View, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/603,325

(22) PCT Filed: Apr. 5, 2021

(86) PCT No.: PCT/US2021/025733
§ 371 (c)(1),
(2) Date: Oct. 12, 2021

(87) PCT Pub. No.: WO2021/211314
PCT Pub. Date: Oct. 21, 2021

(65) Prior Publication Data
US 2022/0124491 A1    Apr. 21, 2022

Related U.S. Application Data

(60) Provisional application No. 63/010,288, filed on Apr. 15, 2020.

(51) Int. Cl.
*H04L 29/06*    (2006.01)
*H04L 9/08*    (2006.01)
(Continued)

(52) U.S. Cl.
CPC ....... *H04W 12/0471* (2021.01); *H04L 9/0869* (2013.01); *H04L 63/0435* (2013.01); *H04L 2209/80* (2013.01)

(58) Field of Classification Search
CPC ............. H04W 12/0471; H04L 9/0869; H04L 63/0435; H04L 2209/80
See application file for complete search history.

(56) References Cited

U.S. PATENT DOCUMENTS

2005/0066175 A1\*  3/2005  Perlman ................ H04L 9/302
713/176
2013/0217333 A1   8/2013  Sprigg et al.
(Continued)

FOREIGN PATENT DOCUMENTS

| WO | 2018093683 | 5/2018 |
|---|---|---|
| WO | 2019032052 | 2/2019 |
| WO | 2020068359 | 4/2020 |

OTHER PUBLICATIONS

Kang, Jinsu, Jeonghoon Seo, and Yoojae Won. "Ephemeral ID beacon-based improved indoor positioning system." Symmetry 10.11 (2018): 622. (Year: 2018).\*

(Continued)

*Primary Examiner* — Shawnchoy Rahman
(74) *Attorney, Agent, or Firm* — Colby Nipper PLLC

(57) ABSTRACT

This document describes a three-party cryptographic handshake protocol in a wireless network in which a sighter receives, from a beacon, a packet including an exponentiation of a random value and a proxy value and generates an end-to-end encrypted ephemeral identifier (E2EE-EID) from the exponentiation of the random value and the proxy value. The sighter generates a message for an owner, selects a private key, and computes an exchanged key using the private key and the E2EE-EID. The sighter extracts a common symmetric key from the exchanged key, encrypts the message using the common symmetric key, and transmits the encrypted message to the owner.

20 Claims, 8 Drawing Sheets

(51) Int. Cl.
 *H04L 9/40* (2022.01)
 *H04W 12/0471* (2021.01)

(56) References Cited

U.S. PATENT DOCUMENTS

| | | |
|---|---|---|
| 2015/0050917 A1 | 2/2015 | Reddy et al. |
| 2015/0200774 A1 | 7/2015 | Le Saint |
| 2015/0372811 A1* | 12/2015 | Le Saint ............... H04L 63/068 |
| | | 705/76 |
| 2016/0050219 A1 | 2/2016 | Niewczas et al. |
| 2019/0058591 A1* | 2/2019 | Sharpe ................. H04L 9/3234 |
| 2019/0149527 A1* | 5/2019 | John ..................... H04L 9/3247 |
| | | 713/171 |
| 2019/0261168 A1 | 8/2019 | Shi et al. |
| 2020/0154271 A1* | 5/2020 | Rane .................... G06F 21/335 |
| 2020/0235929 A1* | 7/2020 | Jacobs ................. H04L 9/3073 |
| 2021/0350938 A1* | 11/2021 | Teissonniere ....... G06F 21/6254 |

OTHER PUBLICATIONS

"International Preliminary Report on Patentability", Application No. PCT/US2021/025733, dated Oct. 13, 2022, 11 pages.
"International Search Report and Written Opinion", Application No. PCT/US2021/025733, dated Aug. 30, 2021, 16 pages.
"Invitation to Pay Additional Fees", PCT Application No. PCT/US2021/025733, dated Jul. 9, 2021, 10 pages.
"WhatsApp Encryption Overview", WhatsApp Encryption Overview, Dec. 19, 2017, 12 pages.
"Foreign Office Action", EP Application No. 21721729.8, dated Oct. 9, 2023, 10 pages.

* cited by examiner

US 11,930,356 B2

THREE-PARTY CRYPTOGRAPHIC HANDSHAKE PROTOCOL

RELATED APPLICATION(S)

This application is a national stage entry of International Application No. PCT/US2021/025733, filed Apr. 5, 2021, which in turn claims priority to U.S. Provisional Application 63/010,288, filed Apr. 15, 2020, the disclosures of which are incorporated herein by reference in their entireties.

BACKGROUND

Beacon systems using ephemeral identifiers are designed to give developers control over which clients can make use of their beacon signals. Ephemeral identifiers and keys shared between a beacon and the beacon's owner enable resolver services to determine the owner of a beacon when a sighter sends the ephemeral identifier to the resolver service. The communication between the sighter of the beacon and the resolver as well as the communication between the resolver and the owner are secured; however, any communication between the beacon and/or the sighter and the owner is not secure and is visible to the resolver.

SUMMARY

This summary is provided to introduce simplified concepts of a three-party cryptographic handshake protocol. The simplified concepts are further described below in the Detailed Description. This summary is not intended to identify essential features of the claimed subject matter, nor is it intended for use in determining the scope of the claimed subject matter.

In aspects, methods, devices, systems, and means for a three-party cryptographic handshake protocol in a wireless network are described in which a sighter receives, from a beacon, a packet including an end-to-end encrypted ephemeral identifier (E2EE-EID). The sighter generates a message for an owner, selects a private key, and computes an exchanged key using the private key and the E2EE-EID. The sighter extracts a common symmetric key from the exchanged key, encrypts the message using the common symmetric key, and transmits the encrypted message to the owner.

In aspects, methods, devices, systems, and means for a three-party cryptographic handshake protocol in a wireless network are described in which a sighter receives, from a beacon, a packet including an exponentiation of a random value and a proxy value and generates an end-to-end encrypted ephemeral identifier (E2EE-EID) from the exponentiation of the random value and the proxy value. The sighter generates a message for an owner, selects a private key, and computes an exchanged key using the private key and the E2EE-EID. The sighter extracts a common symmetric key from the exchanged key, encrypts the message using the common symmetric key, and transmits the encrypted message to the owner.

In aspects, methods, devices, systems, and means for a three-party cryptographic handshake protocol in a wireless network are described in which a beacon determines a common key that is shared between the beacon and an owner. The beacon generates an end-to-end encrypted ephemeral identifier (E2EE-EID) using the common key and a time value. The beacon generates a beacon packet including the E2EE-EID and transmits the beacon packet, the transmitted beacon packet being usable by a sighter receiving the beacon packet to transmit a secure message to the owner.

In aspects, methods, devices, systems, and means for a three-party cryptographic handshake protocol in a wireless network are described in which a beacon generates an exponentiation of a random value that is shared between the beacon and an owner and stores the random value and the exponentiation of the random value. The beacon generates a multiplicative inverse of the random value and stores the multiplicative inverse of the random value. The beacon generates a proxy value using the stored value of the multiplicative inverse and a time value and generates a beacon packet including the exponentiation of the random value and the proxy value. The beacon transmits the beacon packet, the transmitted beacon packet being effective to cause a sighter receiving the beacon packet to generate an end-to-end encrypted ephemeral identifier (E2EE-EID) that is usable to transmit a secure message to the owner.

While features and concepts of the described systems and methods for a three-party cryptographic handshake protocol can be implemented in any number of different environments, systems, devices, and/or various configurations, embodiments of a three-party cryptographic handshake protocol are described in the context of the following example devices, systems, and configurations.

BRIEF DESCRIPTION OF THE DRAWINGS

Embodiments of a three-party cryptographic handshake protocol are described with reference to the following drawings. The same numbers are used throughout the drawings to reference like features and components.

DETAILED DESCRIPTION

Low-power wireless beacons, such as Bluetooth Low Energy (Bluetooth LE, BLE) beacons, transmit information in beacon packets (e.g., advertisement packets). A beacon may transmit broadcast information that is directly identifiable (e.g., unencrypted data) or broadcast an identifier that changes every few minutes, an ephemeral identifier (ephemeral ID, EID). The ephemeral identifier can be resolved to useful information by an owner that shares a key (the Ephemeral Identity Key, or EIK) with the individual beacon. Although the following discussion frequently refers to BLE, BLE is an example wireless technology that is discussed for simplicity, but the ephemeral identifiers discussed herein may also be applied to another wireless technology (e.g., Ultra Wideband (UWB), Wireless Local Area Network (WLAN), NFC, a personal area network (PAN), IEEE 802.15.4, ZigBee, Thread, or the like) in a similar manner.

A beacon system using ephemeral identifiers, such as the Eddystone™ open beacon format, is designed to give developers control over which clients can make use of their beacon signals. By using a pre-agreed pseudorandom function family (PRF) to share state between a beacon and an owner, the beacon can enable a sighter with an algorithmic method to secure a channel to the owner without knowing who the owner is or without having access to the owner. By enabling the sighter to be sure that the channel to the correct owner, that shared a key with the beacon, is secure, the owner is able to decrypt and check the authenticity of a message received from the sighter. A resolver that resolves and finds the owner of the beacon cannot access the content of the message sent by the sighter to the owner.

Example Environment

Figure 1:
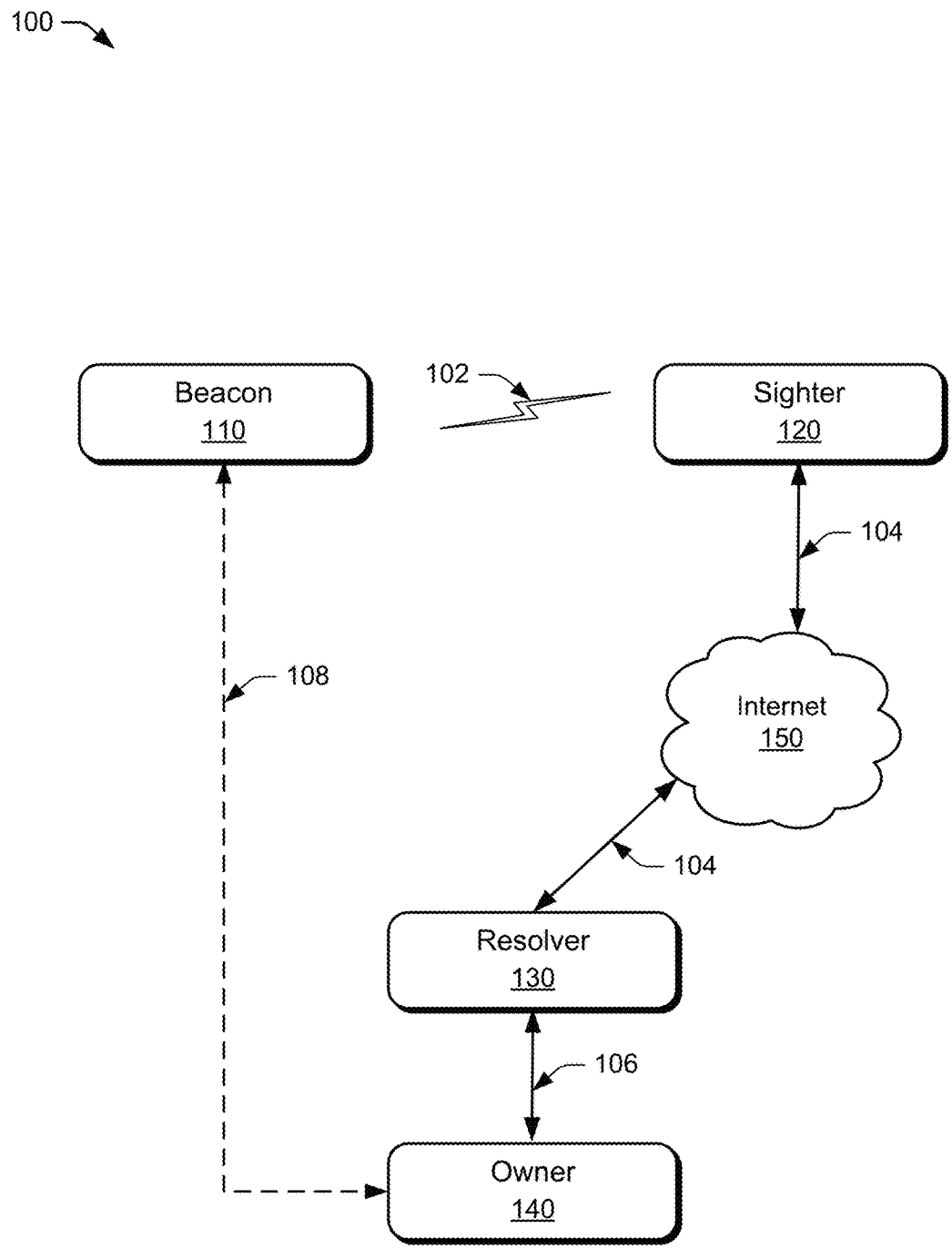
FIG. 1 illustrates an example environment in which various embodiments of a three-party cryptographic handshake protocol can be implemented.

FIG. 1 illustrates an example environment 100 in which various embodiments of a three-party cryptographic handshake protocol can be implemented. The environment 100 includes a beacon 110, a sighter 120, a resolver 130, and an owner 140. The beacon 110 is a device, such as a BLE beacon, a headset, or the like that periodically broadcasts (e.g., transmits) beacon packets, as shown at 102. The sighter (or observer) 120 is a device, such as a smartphone, that can receive the beacon packets and forward the received packets to a resolver service, as shown at 104. For example, the sighter 120 forwards the received packets to a resolver service 130 via the Internet 150. In this example, the Internet 150 represents any combination of wired and/or wireless, local and/or wide area networks that interconnect the sighter 120, the resolver 130, and/or the owner 140. The resolver 130, such as a cloud-based resolver service (resolution service) compares received EIDs against hash values of shared keys and associated owners to determine the correct owner and forward the received packet to the correct owner 140, as shown at 106. Alternatively or additionally, the owner 140 can query the resolver 130 for packets or messages received from sighters 120 for any beacons 110 associated with the owner 140. The owner 140 is a device or service, such as a smartphone, computer, or cloud-based service, associated with the beacon 110. The owner 140 may own one or more beacons 110 and store the shared keys for each of those beacons 110.

The three-party cryptographic handshake protocol can be used with any suitable devices configured for communication as illustrated in FIG. 1. The owner 140 can be any owner computing system. The beacon 110 can be any device associated with the owner computing system. A communication from the device to the owner computing system is anonymized (by hiding the identities of both the device and owner computing system) and involving a routing system (e.g., the resolver 130) to resolve the anonymity into an identification of the owner computing system and device and connecting the device to the owner computing system. The sighter 120 can be any sighter system that is an intermediary device that receives a beacon packet from the device and sends sighting information about the sighting of the device to its owner computing system in spite of the anonymity. The sighting information is kept secure from the resolver (and any other network nodes) except the owner computing system.

The beacon 110 is a device that periodically transmits (broadcasts) a beacon packet (e.g., a BLE advertisement packet) that includes an ephemeral identifier (EID) that is generated from a shared key (EIK), which is shared between the beacon 110 and the owner 140, and the time at which the EID is generated by the beacon 110. The beacon 110 calculates a new EID at a rotation rate known to the beacon 110 and its owner 140. The beacon 110 may have limited computational and power resources and broadcasts the beacon packets over a limited range. The sighter 120 can receive beacon packets from the beacon 110 and has access to a longer-range network (e.g., a Wide Area Network, WAN). The sighter 120 can connect to cloud-based services, such as the resolver 130, over the longer-range network. This enables the sighter 120 to forward received beacon packets to a cloud-based resolver 130. The resolver 130 can be a device (server) or a collection of devices that form a cloud-based service. The resolver 130 stores a set of owners 140 and associated EIDs for those owners. The resolver 130 compares a received EID from a beacon packet to its stored set of EIDs to determine the associated owner 140 for the received beacon packet. Once an owner 140 is identified for a received beacon packet, the resolver 130 can forward the beacon packet to the correct owner 140 of that packet.

At initialization of a beacon 110, the beacon 110 and the owner 140 use an elliptic curve Diffie-Hellman key agreement protocol to exchange a key (EIK) that is shared between the beacon 110 and the owner 140, shown at 108. The shared EIK enables the resolver 130 to resolve, based on time, the identity of the beacon 110 from the EID and to direct a message from the beacon 110 and/or the sighter 120 to the owner 140. The communication between the sighter 120 and the resolver 130 as well as the communication between the resolver 130 and the owner 140 are secured using Transport Layer Security (TLS). However, any communication between the beacon 110 and/or the sighter 120 and the owner 140 is visible to the resolver 130. Adding a secure (encrypted) end-to-end communication channel from the sighter 120 to the owner 140 provides secrecy for messages from the beacon 110 and/or sighter 120 to the owner 140 using the resolver 130 as a routing element that cannot access the encrypted payload of a message between the sighter 120 and the owner 140.

Three-Party Cryptographic Handshake Protocol

When the beacon 110 is paired with the owner 140, the beacon 110 and the owner 140 initiate a common state and agree upon a common key (the EIK) as described above. From that common state, the beacon 110 and the owner 140 can decide on a common rotating key based on a PRF. The sighter 120 encrypts a message to send to the owner 140 using a key based on a PRF (e.g., a PRF-S key). This pairing and initiation are performed in a secure physical environment based on proximity and a lack of other near-by devices to ensure the keys are known only to the beacon 110 and the owner 140.

At the time of a broadcast by the beacon 110, the beacon 110 will assist the sighter 120 to establish a secure channel between the sighter 120 and the owner 140, based on the coordinated PRF-S at that time. Optionally or additionally, there may be an authentication rotating-key based on a PRF shared between owner 140 and beacon 110 to privately sign (e.g., with a Message Authentication Code, MAC) the reported time with an authentication tag (e.g., an authentication tag created using a PRF tag key (PRF-T key)) that is sent from the beacon 110. This authentication tag ensures that the resolver 130 cannot send forged messages to the owner 140 with no sighter 120 being involved. As noted above, the beacon 110 has its channel to the resolver 130 to establish its identity and its owner 140 and a secure channel to send a secure payload.

The beacon 110 assists the sighter 120 to establish a secure channel with the owner 140. The beacon 110 uses an end-to-end encrypted ephemeral identifier (E2EE-EID). The E2EE-EID is represented to the resolver 130 for identifier resolution and identification of the owner at a time, t. Otherwise, the time, t, is available or guessed at by the owner 140.

The beacon 110 evaluates:

$$x(t)=PRF\text{-}S(t) \tag{1}$$

with the joint key (EIK) and x(t) is in the field of exponent (field elements) that are used for exponentiation. In Elliptic Curve Cryptography (ECC), elliptic curve multiplication is used for this operation.

The beacon 110 computes the E2EE-EID:

$$g(t)=G\hat{\ }\{x(t)\} \tag{2}$$

and sends g(t) (the E2EE-EID) in its beacon packet. This computation uses exponentiation or in the case of ECC curve elements after curve multiplication. G is a generator agreed upon in the system to perform the elliptic curve Diffie-Hellman key exchange.

Optionally to add an authentication tag to the message sent to the owner 140, the beacon 110 also evaluates:

$$v(t)=PRF\text{-}T(t) \tag{3}$$

that is used to authenticate the value of the reported time from the beacon 110. Note that the beacon 110 is in a transmit-only broadcast mode so no interactive mode is possible, and the beacon 110 does not have a certified signature scheme. The v(t) calculation is akin to a pre-authentication to make sure that, with a relatively light-weight calculation, the owner 140 can verify that a message, m, is from the correct beacon 110, with the resolved ID reported by the sighter 120. The authentication tag is included in a different portion of a packet sent from the resolver 130 to the owner 140 than the payload of the message. The three-party cryptographic handshake protocol works without the v(t) calculation; if the resolver 130 can be trusted, then the resolver 130 can compute t.

The beacon 110 transmits (broadcasts) a beacon packet including: g(t), and optionally v(t), to the sighter 120. Optionally, the beacon 110 may include data in the beacon packet, such as a status of the beacon 110, a remaining battery capacity of the beacon 110, a sensor reading from a sensor included in the beacon 110, or the like. After receiving the beacon packet, the sighter 120 generates a message, m, to send to the owner 140 including private information that will not be readable by the resolver 130. The message, m, can include the data received in the beacon packet as well as additional information included by the sighter 120, such as a location where the sighter 120 received the beacon packet, additional sensor data from the sighter 120, or the like. The sighter 120 chooses a private key, y(t), and computes:

$$gy(t)=g(t)\hat{\ }\{y(t)\} \tag{4}$$

that is the exchanged key, where g(t) (the E2EE-EID) is the public key that is broadcast by the beacon 110. The sighter 120 extracts from the exchanged key a common symmetric key, k(t), for encrypting and authenticating the message the sighter 120 sends by using this key, k(t), to encipher the message, m, using:

$$C(t,m)=E(k(t),m) \tag{5}$$

that encrypts the message. The sighter 120 sends, to the resolver 130, the sighter message that includes: t, g(t), gy(t), C(t, m), and optionally v(t).

The resolver 130 resolves the E2EE-EID in the message from the sighter 120 to find the owner 140, as described above. Once the owner 140 is found, the resolver 130 forwards the sighter message (the message m) to the owner 140, with the time, t, that the resolver 130 found to match the received E2EE-EID in the message.

Optionally, the owner 140 computes PRF-T(t) and matches it with v(t) to authenticate the reported time in the beacon packet. If the values of PRF-T(t) and v(t) match, the owner 140 computes x'(t)=PRF-S(t) and g'(t)=G^{x'(t)}, and the owner 140 compares g'(t) to the g(t) received from the sighter 120. Note that if the resolver 130 can be trusted not to forge messages, such as the resolver 130 and the owner 140 being owned by the same organization, this validation may not be required.

If the validation of g'(t) to g(t) yields a correct validation, the owner 140 computes gy(t)^{x'(t)} that should be equal to the exchanged key. The owner 140 extracts k'(t)=k(t) from gy(t)^{x'(t)} and decrypts C(t, m) to get the message m. Note that the encryption may be optionally authenticated, such as a message plus MAC, or using a mode like Google Cloud Messaging (GCM) or Counter with CBC-MAC (CCM) that provides integrity.

As a result of using the three-party cryptographic handshake protocol, the owner 140 can receive secret messages from the beacon 110 and/or the sighter 120 via the resolver 130 and based on the broadcasting of the beacon 110 being received by the sighter 120. The message is authenticated and decryptable only by the owner 140, while the resolver 130 or any other node along the network between the sighter 120 and the owner 140 cannot access the content of the message. For operation of messaging using the three-party cryptographic handshake protocol, it is only assumed that the resolver 130 will correctly route the message, m, to the owner 140. The properties for the three-party cryptographic handshake protocol are all derived from the initial sharing of keys between the beacon 110 and the owner 140.

Proxy Encryption

The beacon 110 may have limited computational and power resources. The calculation of g(t)=G^{x(t)} for each broadcast requires exponentiation, or in some implementations elliptic curve point multiplication, either of which can be costly when using the limited resources of the beacon 110. To reduce the resources consumed at the beacon 110 at broadcast time, a proxy encryption can be used that allows a value with one exponent g^x to turn to another value g^y by giving a proxy y/x. The proxy in the three-party cryptographic handshake protocol is the sighter 120. The proxy (the sighter 120) can transform but cannot find x itself. The proxy encryption includes an initialization phase and changes in the three-party cryptographic handshake protocol at the time of the broadcast by the beacon 110. Optionally, the initialization phase may be included as part of the pairing process between the beacon 110 and the owner 140.

At initialization, a random exponentiation g^s is computed and g^s and a random value, s, are stored in the beacon 110. A multiplicative inverse, 1/s is computed. 1/s is a multiplicative inverse in the field that is computed by computing the Extended-Greatest Common Divisor (GCD) of s and d, where d is the order of the multiplicative group in the field and where s and d are relatively prime. This algorithm for the Extended-GCD gives: A and B such that As+Bd=1, and since d is the order zero in the field, this gives As=1 so A=1/s. A (the multiplicative inverse of s) is also stored in the beacon 110. Executing this initialization is a relatively expensive mechanism but is run only once and, optionally, the owner 140 can perform these calculations for the beacon 110 at pairing time.

At broadcast time, the beacon 110 evaluates x(t) as shown in equation 1 above. The beacon 110 computes a proxy value, prox(t) where:

$$\text{prox}(t) = A * x(t) \quad (6)$$

using scalar multiplication in the multiplicative group. The beacon transmits g^s and prox(t) in a beacon packet. When the sighter 120 receives the beacon packet, the sighter 120 exponentiates {g^s}^{prox(t)} which equals g^{x(t)}. The sighter 120 is the proxy for producing the exponentiation (or elliptic curve point multiplication) on behalf of the beacon 110 to generate the E2EE-EID. The sighter 120 cannot learn s, while the beacon 110 only performs online (e.g., post-provisioning) scalar multiplication. Then the sighter 120 continues the protocol as described above.

Figure 2:
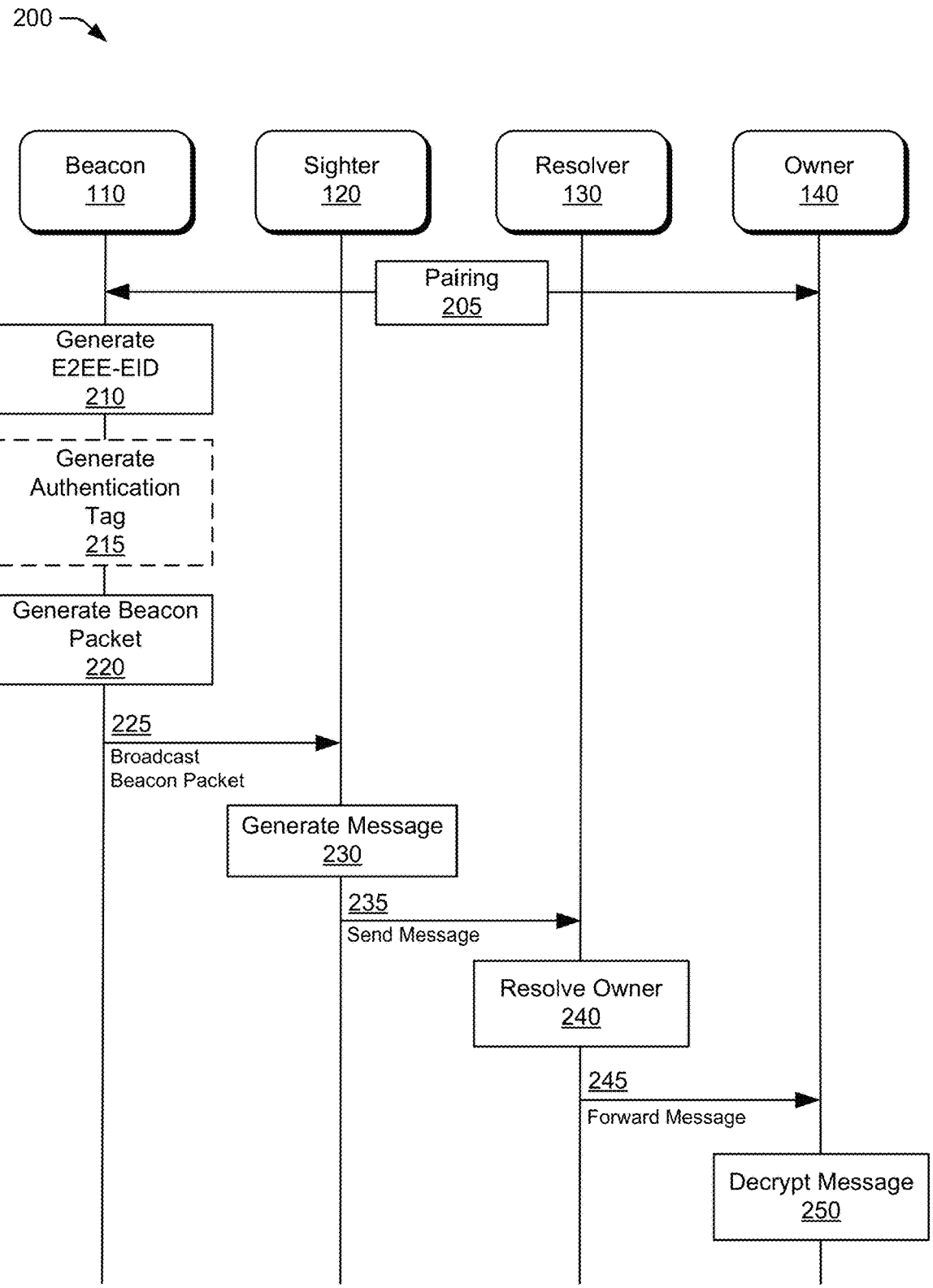
FIG. 2 illustrates example data and control transactions between devices in accordance with aspects of a three-party cryptographic handshake protocol.

FIG. 2 illustrates data and control transactions between devices in accordance with aspects of the three-party cryptographic handshake protocol. Although not illustrated for the sake of illustration clarity, various acknowledgements for messages illustrated in FIG. 2 may be implemented to ensure reliable operations of the three-party cryptographic handshake protocol.

At 205, and as described above, the beacon 110 is paired with the owner 140. The pairing includes sharing keys for the three-party cryptographic handshake protocol.

At 210, the beacon generates the E2EE-EID based on the current time. Optionally at 215, the beacon 110 generates an authentication tag for the beacon packet.

At 220, the beacon 110 generates a beacon packet. The beacon 110 includes the E2EE-EID and, optionally if generated, the authentication tag, in the beacon packet. Optionally, the beacon 110 may include payload data, such as sensor data, in the beacon packet. Note that based on a predetermined rotation rate for the E2EE-EIDs, the beacon 110 repeats the operations of 210, 215, and 220 for each successive cycle of the rotation (not illustrated in FIG. 2). At 225, beacon 110 transmits the beacon packet. The beacon 110 may transmit the beacon packet one or more times during each cycle of the rotation.

At 230, after receiving a beacon packet from the beacon 110, the sighter 120 generates a message to send to the owner 140. Optionally, the sighter 120 may include additional data in the message, such as the sighter's location when the beacon packet was received. As part of generating the message, the sighter 120 extracts a common symmetric key, k(t), for encrypting and authenticating the message and encrypts the message. At 235, the sighter sends the message to the resolver 130.

At 240, the resolver 130 resolves, based on time, the identity of the beacon 110 from the E2EE-EID and compares the identity to a set of owners 140 and associated E2EE-EIDs for those owners. If the resolver identifies the owner 140 for the received message, the resolver forwards, at 245, the message to the owner 140. At 250, the owner decrypts the received message.

Policy Controls

The ability for a sighter 120 to add information, such as a location of the reception of a beacon packet, can enable one or more sighters 120 to track a beacon 110. For example, the beacon 110 can be a device carried by a person or attached to a vehicle. If the sighter 120 is also the owner 140, the rate at which sighting data is available to the owner may not be of concern. If a large group of sighters 120 are used to crowdsource the location of the beacon 110 over time, policy controls on the rate and/or latency with which tracking data is made available to the owner can be implemented. For example, a policy that sets a minimum time period between receiving a beacon packet by a sighter 120 and transmitting a message from the sighter 120 to the owner 140 reduces the ability for real-time tracking of the beacon 110. In another example, a minimum time period between receiving a message at the resolver 130 and forwarding the message to the owner 140 also reduces the ability for real-time tracking of the beacon 110. Additionally or optionally, the messages from beacon sightings may be buffered in batches at the sighter 120 and/or resolver 130 with the transmission of the batches of messages being delayed reducing the possibility for real-time tracking.

Example Methods

Example methods 300-600 are described with reference to respective FIGS. 3-6 in accordance with one or more embodiments of a three-party cryptographic handshake protocol. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
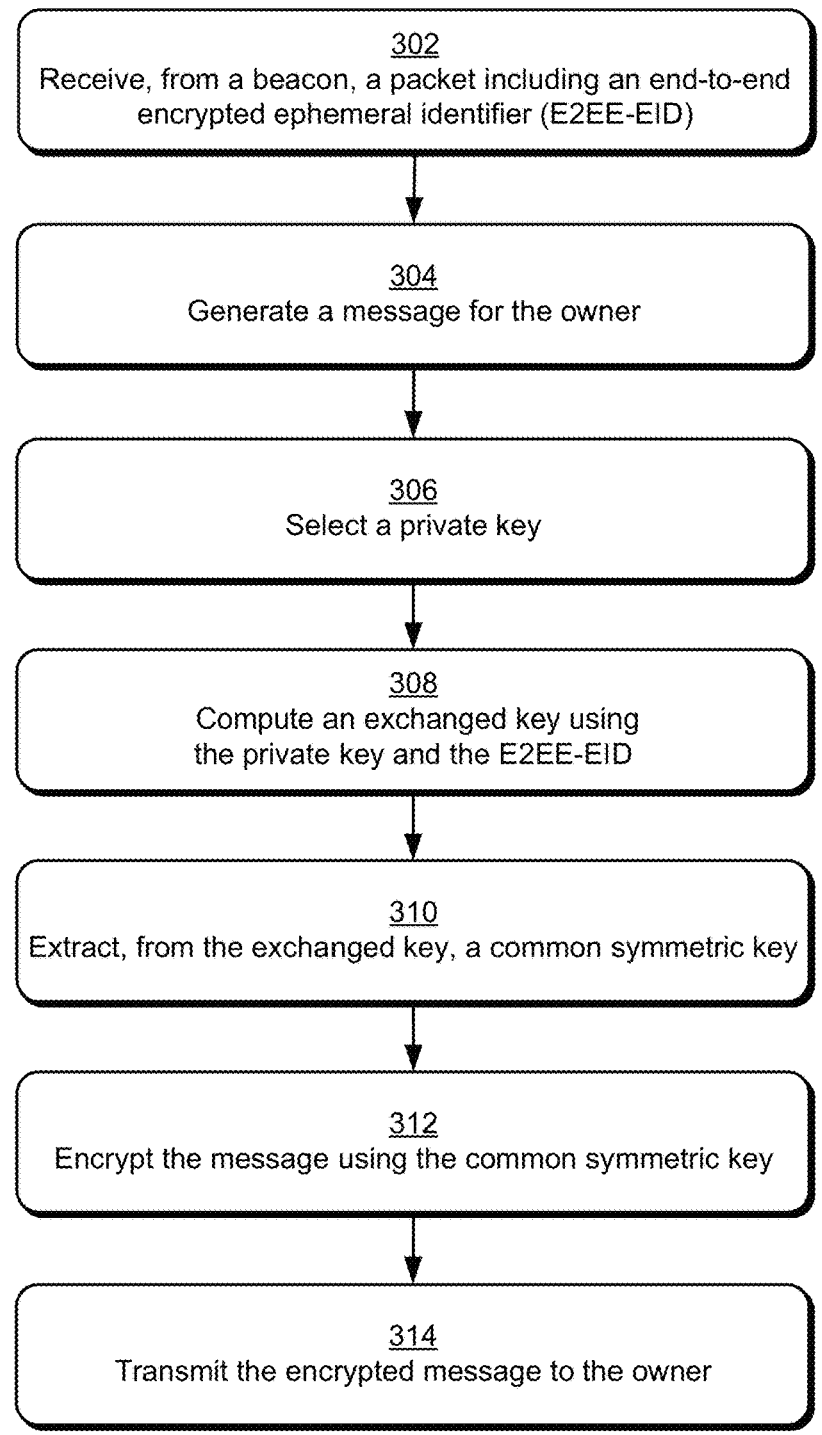
FIG. 3 illustrates an example method of a three-party cryptographic handshake protocol in accordance with embodiments of the techniques described herein.

FIG. 3 illustrates example method(s) 300 of a three-party cryptographic handshake protocol as generally related to securely communicating a message from a sighter to an owner. At block 302, a sighter (e.g., the sighter 120) receives, from a beacon (e.g., the beacon 110), a packet including an end-to-end encrypted ephemeral identifier (E2EE-EID).

At block 304, the sighter generates a message (e.g., the message m) for the owner (e.g., the owner 140). At block 306, the sighter selects a private key (e.g., the private key, y(t)).

At block 308, the sighter computes an exchanged key (e.g. the exchanged key, gy(t)) using the private key and the E2EE-EID. At block 310, the sighter extracts, from the exchanged key, a common symmetric key (e.g., the common symmetric key, k(t)). At block 312, the sighter encrypts the message using the common symmetric key, and at bock 314, the sighter transmits the encrypted message to the owner.

Figure 4:
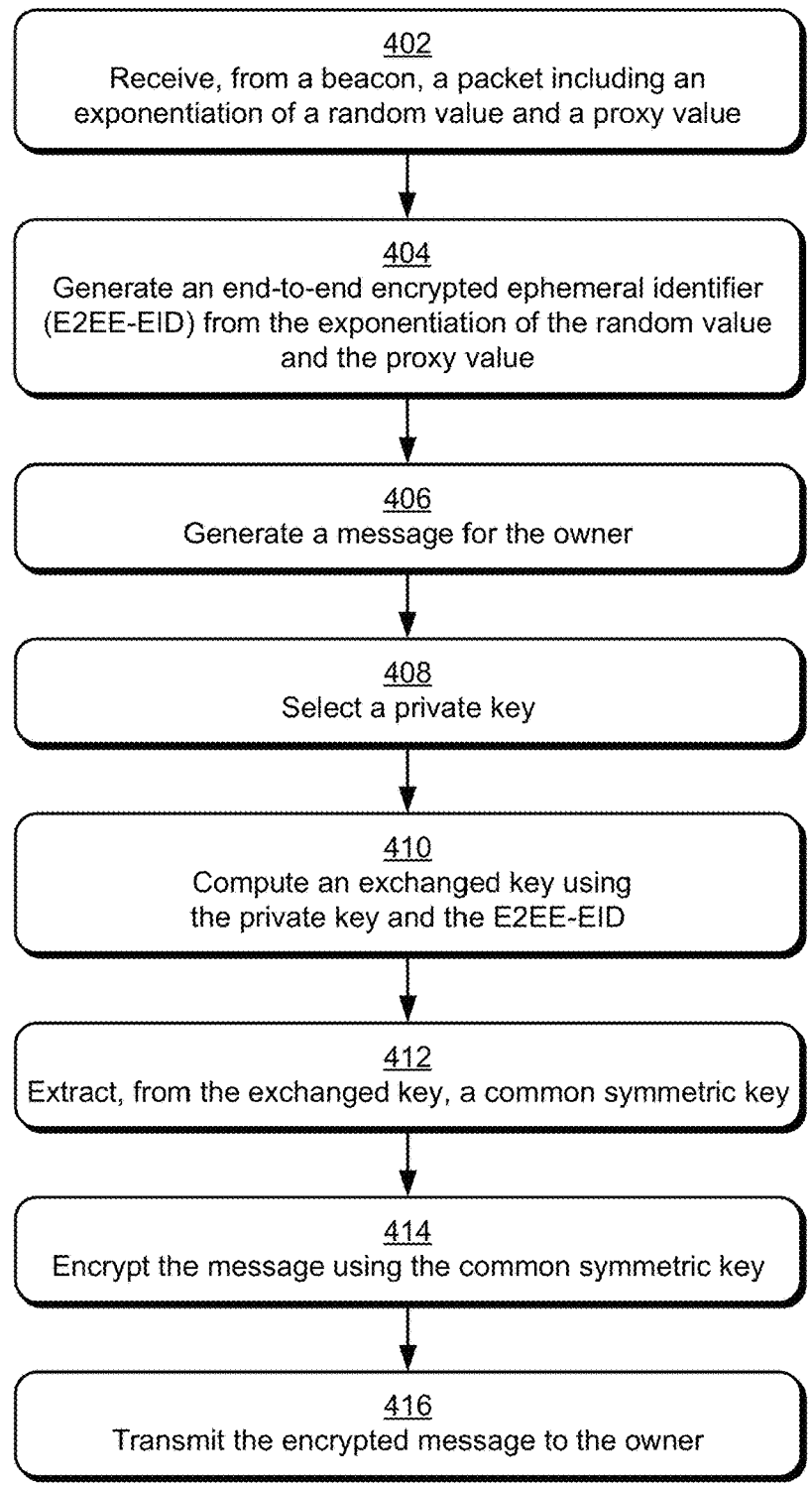
FIG. 4 illustrates an example method of a three-party cryptographic handshake protocol in accordance with embodiments of the techniques described herein.

FIG. 4 illustrates example method(s) 400 of a three-party cryptographic handshake protocol as generally related to securely communicating a message from a sighter to an owner. At block 402, a sighter (e.g., the sighter 120)

receives, from a beacon (e.g., the beacon 110), a packet including an exponentiation of a random value (e.g., the exponentiation gˆs) and a proxy value (e.g., the proxy value, prox(t)). At block 404, the sighter generates an end-to-end encrypted ephemeral identifier (E2EE-EID) from the exponentiation of the random value and the proxy value.

At block 406, the sighter generates a message (e.g., the message m) for the owner (e.g., the owner 140). At block 408, the sighter selects a private key (e.g., the private key, y(t)).

At block 410, the sighter computes an exchanged key (e.g. the exchanged key, gy(t)) using the private key and the E2EE-EID. At block 412, the sighter extracts, from the exchanged key, a common symmetric key (e.g., the common symmetric key, k(t)). At block 414, the sighter encrypts the message using the common symmetric key, and at bock 416, the sighter transmits the encrypted message to the owner.

Figure 5:
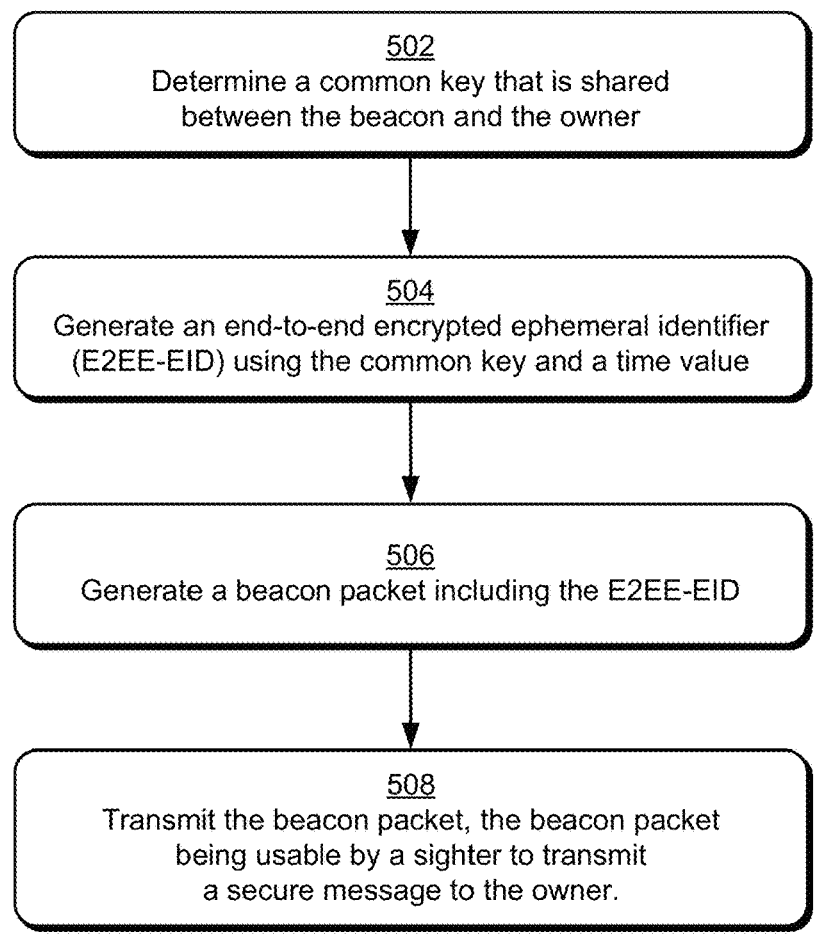
FIG. 5 illustrates an example method of a three-party cryptographic handshake protocol in accordance with embodiments of the techniques described herein.

FIG. 5 illustrates example method(s) 500 of a three-party cryptographic handshake protocol as generally related to securely communicating a message from a sighter to an owner. At block 502, a beacon (e.g., the beacon 110) determines a common key that is shared between the beacon and the owner. At block 504, the beacon generates an end-to-end encrypted ephemeral identifier (E2EE-EID) using the common key and a time value.

At block 506, the beacon generates a beacon packet including the E2EE-EID. At block 508, the beacon transmits the beacon packet, the beacon packet being usable by a sighter (e.g., the sighter 120) to transmit a secure message to the owner.

Figure 6:
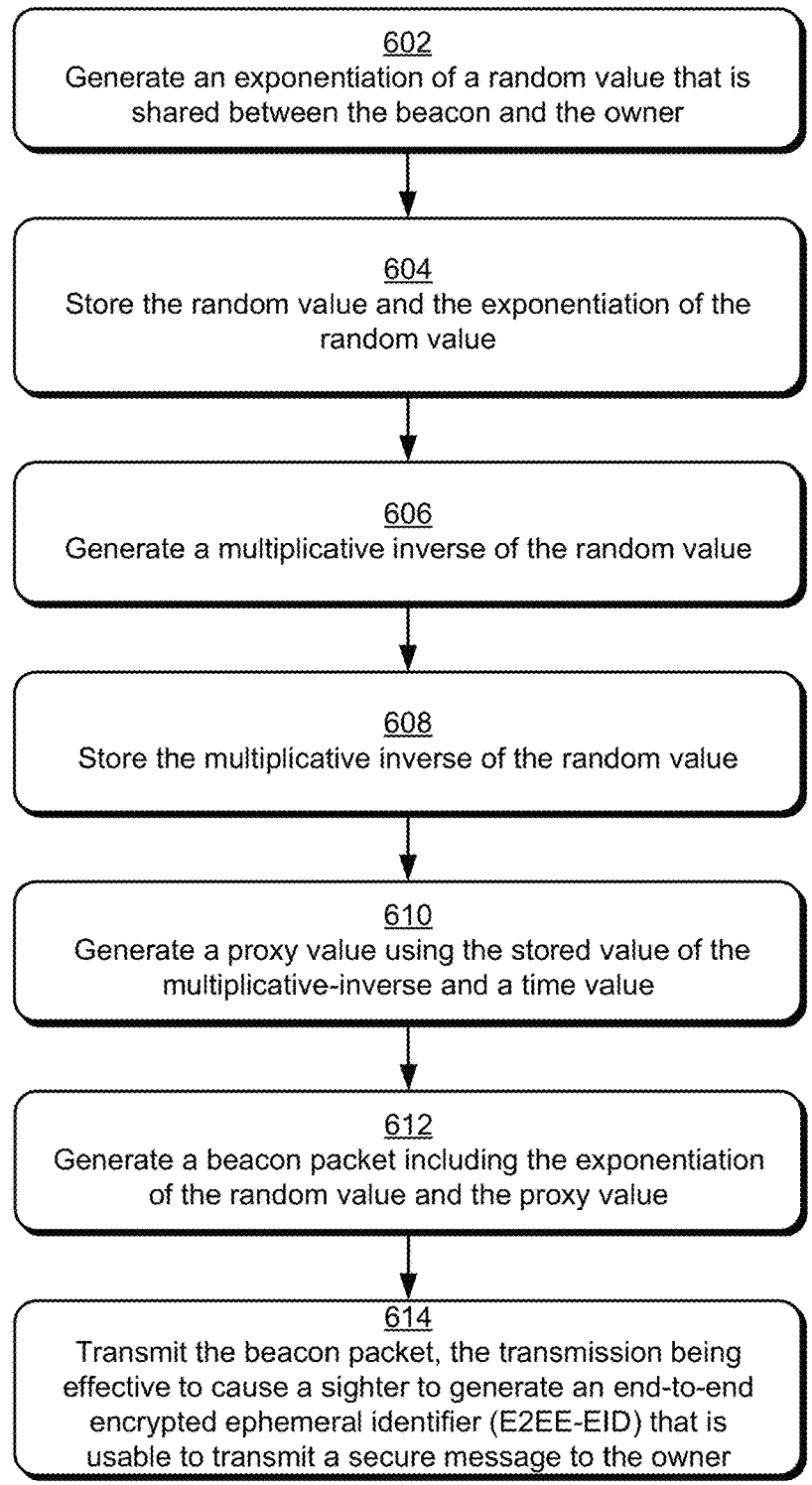
FIG. 6 illustrates another example method of a three-party cryptographic handshake protocol in accordance with embodiments of the techniques described herein.

FIG. 6 illustrates example method(s) 600 of a three-party cryptographic handshake protocol as generally related to securely communicating a message from a sighter to an owner. At block 602, a beacon (e.g., the beacon 110) generates an exponentiation of a random value (e.g., the exponentiation, gˆs, and the random value, s) that is shared between the beacon and the owner (e.g. the owner 140). At block 604, the beacon stores the random value and the exponentiation of the random value.

At block 606, the beacon generates a multiplicative inverse of the random value (e.g., the multiplicative inverse, A). At block 608, the beacon stores the multiplicative inverse of the random value. At block 610, the beacon generates a proxy value (e.g., the proxy value, prox(t)) using the stored value of the multiplicative inverse and a time value.

At block 612, the beacon generates a beacon packet including the exponentiation of the random value and the proxy value. At block 614, the beacon transmits the beacon packet, the transmitting being effective to cause a sighter (e.g., the sighter 120) to generate an end-to-end encrypted ephemeral identifier (E2EE-EID) that is usable to transmit a secure message to the owner.

Example Devices

Figure 7:
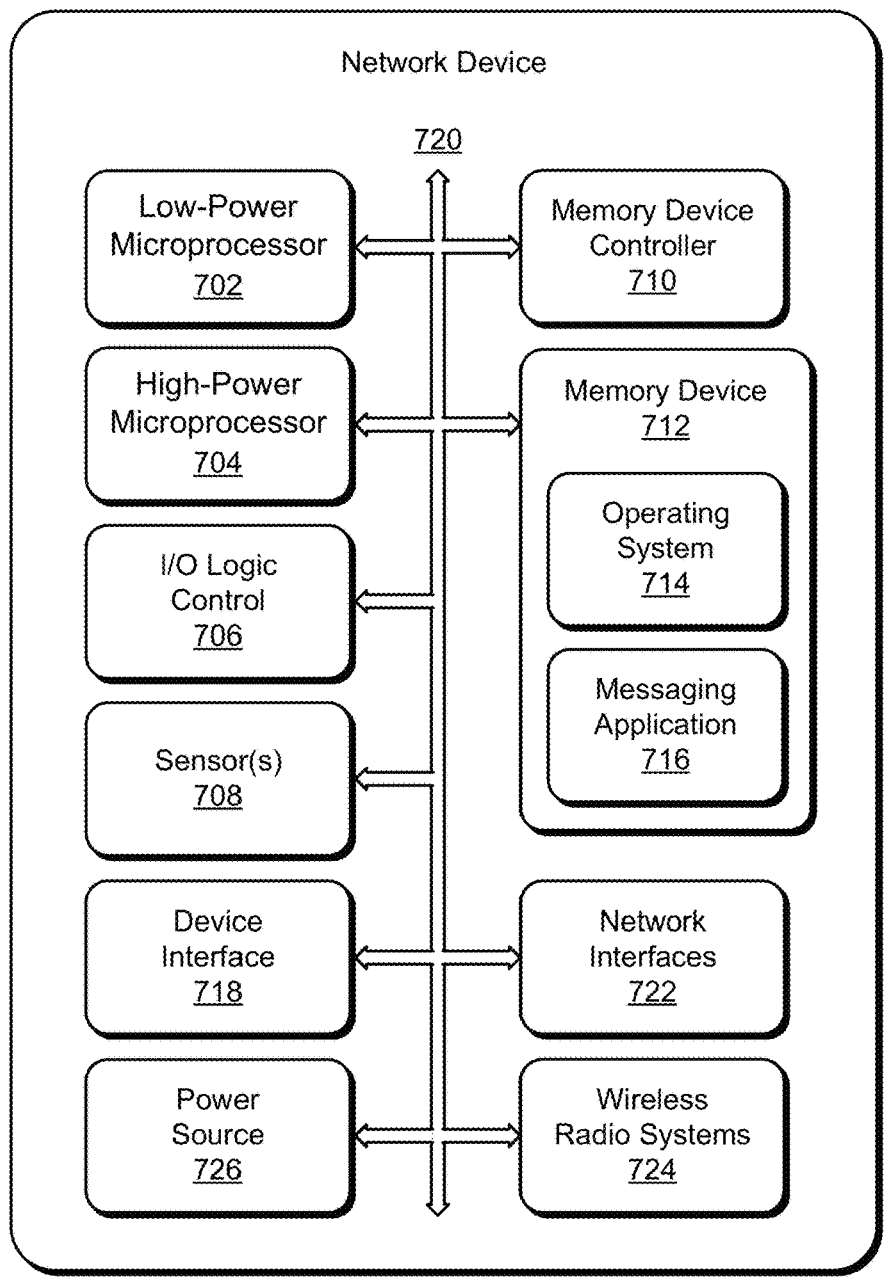
FIG. 7 illustrates an example network device that can be implemented in a network environment in accordance with one or more embodiments of the techniques described herein.

FIG. 7 illustrates an example network device 700 that can be implemented as any of the network devices in a network in accordance with one or more embodiments of a three-party cryptographic handshake protocol as described herein, such as the sighter 120, the resolver 130, or the owner 140. The network device 700 can be integrated with electronic circuitry, microprocessors, memory, input output (I/O) logic control, communication interfaces and components, as well as other hardware, firmware, and/or software to implement the device in a network.

In this example, the network device 700 includes a low-power microprocessor 702 and/or a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less-complex processes such as detecting a hazard or temperature from one or more sensors 708. The low-power processor 702 may also wake or initialize the high-power processor 704 for computationally intensive processes.

The one or more sensors 708 may be included and implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GPS receivers, and radio frequency identification detectors. In implementations, the network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The network device 700 includes a memory device controller 710 and a memory device 712, such as any type of a nonvolatile memory and/or other suitable electronic data storage device. The network device 700 can also include various firmware and/or software, such as an operating system 714 that is maintained as computer executable instructions by the memory and executed by a microprocessor. The device software may also include a messaging application 716 that implements embodiments of a three-party cryptographic handshake protocol. The network device 700 also includes a device interface 718 to interface with another device or peripheral component and includes an integrated data bus 720 that couples the various components of the wireless network device for data communication between the components. The data bus in the wireless network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The network device 700 can include network interfaces 722, such as a wireless network interface for communication with other wireless network devices in a wireless network, and an external network interface for network communication, such as via the Internet. The network device 700 also includes wireless radio systems 724 for wireless communication with other wireless network devices via the wireless network interface and for multiple, different wireless communications systems. The wireless radio systems 724 may include Wi-Fi, Bluetooth™, BLE, Mobile Broadband, and/or point-to-point IEEE 802.15.4. Each of the different radio systems can include a radio device, antenna, and chipset that is implemented for a particular wireless communications technology. The network device 700 also includes a power source 726, such as a battery and/or to connect the device to line voltage. An AC power source may also be used to charge the battery of the device.

Figure 8:
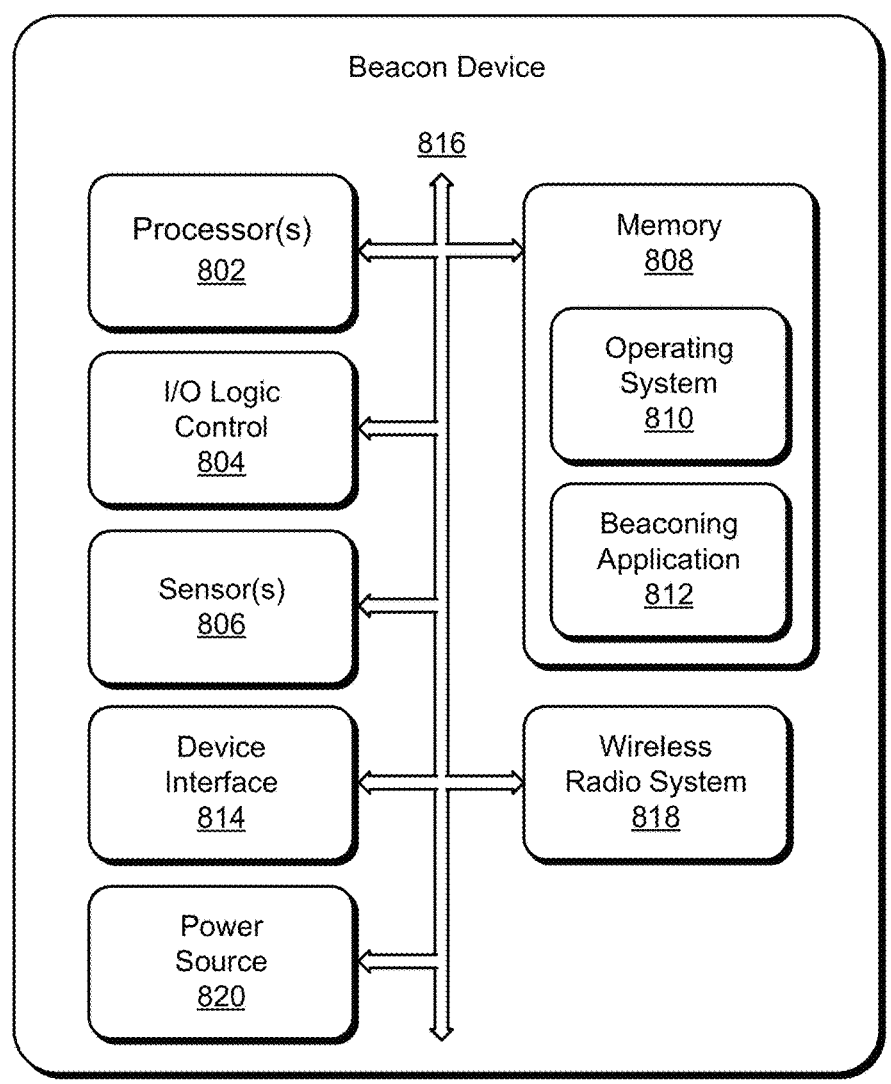
FIG. 8 illustrates an example beacon device that can be implemented in a network environment in accordance with one or more embodiments of the techniques described herein.

FIG. 8 illustrates an example beacon device 800 that can be implemented as the beacon device 110 in a network in accordance with one or more embodiments of a three-party cryptographic handshake protocol as described herein. The beacon device 800 can be integrated with electronic circuitry, microprocessors, memory, input output (I/O) logic control, communication interfaces and components, as well as other hardware, firmware, and/or software to implement the device in a network.

In this example, the beacon device 800 includes one or more processors 802 (e.g., microcontrollers or digital signal processors) that process executable instructions. The device also includes an input-output (I/O) logic control 804 (e.g., to include electronic circuitry). The processor(s) can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

Optionally or additionally, one or more sensors 806 may be included and implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 806 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GPS receivers, and radio frequency identification detectors. In implementations, the beacon device 800 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The beacon device 800 includes a memory 808, such as any type of a nonvolatile memory and/or other suitable electronic data storage device. The beacon device 800 can also include various firmware and/or software, such as an operating system 810 that is maintained as computer executable instructions by the memory and executed by a processor. The device software may also include a beaconing application 812 that implements embodiments of a three-party cryptographic handshake protocol. Optionally or additionally, the beacon device 800 also includes a device interface 814 to interface with another device or peripheral component. The beacon device 800 includes an integrated data bus 816 that couples the various components of the beacon device for data communication between the components. The data bus in the beacon device may also be implemented as any one or a combination of different bus structures and/or bus architectures.

The device interface 814 may receive input from a user and/or provide information to the user (e.g., as a user interface), and a received input can be used to determine a setting. The device interface 814 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 814 may also receive inputs from any number of peripherals, such as buttons, a keypad, a switch, a microphone, and an imager (e.g., a camera device).

The beacon device 800 can include a wireless radio system 818 for wireless communication. The wireless radio system 818 may include Wi-Fi, Bluetooth™, BLE, Mobile Broadband, and/or point-to-point IEEE 802.15.4. The wireless radio system 818 can include a radio device, antenna, and chipset that is implemented for a particular wireless communications technology. The beacon device 800 also includes a power source 820, such as a battery and/or to connect the device to line voltage. An AC power source may also be used to charge the battery of the device.

In the following text some examples are described:

Example 1

A method of securely communicating a message from a sighter to an owner, the method comprising:
receiving, from a beacon, a packet including an end-to-end encrypted ephemeral identifier (E2EE-EID);
generating the message for the owner;
selecting a private key;
computing an exchanged key using the private key and the E2EE-EID;
extracting, from the exchanged key, a common symmetric key;
encrypting the message using the common symmetric key; and
transmitting the encrypted message to the owner.

Example 2

The method of example 1, further comprising the sighter:
receiving data from the beacon in the packet; and wherein the generating the message for the owner comprises the sighter including the received data in the message for the owner.

Example 3

The method of example 1 or example 2, wherein the generating the message for the owner comprises the sighter: including data from the sighter in the message.

Example 4

The method of example 3, wherein the data from the sighter includes a location of the sighter when the sighter received the packet from the beacon.

Example 5

The method of any of the preceding examples, further comprising the sighter:
receiving, from the beacon and in the packet, an authentication tag for the packet; and
wherein the generating the message for the owner comprises the sighter including the authentication tag in the message for the owner.

Example 6

A method of securely communicating a message from a sighter to an owner, the method comprising:
receiving, from a beacon, a packet including an exponentiation of a random value and a proxy value;
generating an end-to-end encrypted ephemeral identifier (E2EE-EID) from the exponentiation of the random value and the proxy value;
generating the message for the owner;
selecting a private key;
computing an exchanged key using the private key and the E2EE-EID;
extracting, from the exchanged key, a common symmetric key;
encrypting the message using the common symmetric key; and
transmitting the encrypted message to the owner.

Example 7

The method of example 6, further comprising the sighter:
receiving data from the beacon in the packet; and
wherein the generating the message for the owner comprises the sighter including the received data in the message for the owner.

Example 8

The method of example 6 or example 7, wherein the generating the message for the owner comprises the sighter: including data from the sighter in the message.

Example 9

The method of example 8, wherein the data from the sighter includes a location of the sighter when the sighter received the packet from the beacon.

Example 10

The method of any of examples 6 to 9, further comprising the sighter:
receiving, from the beacon and in the packet, an authentication tag for the packet; and
wherein the generating the message for the owner comprises the sighter including the authentication tag in the message for the owner.

Example 11

A method of securely communicating a message from a beacon to an owner, the method comprising the beacon:
determining a common key that is shared between the beacon and the owner;
generating an end-to-end encrypted ephemeral identifier (E2EE-EID) using the common key and a time value;
generating a beacon packet including the E2EE-EID; and
transmitting the beacon packet, the beacon packet being usable by a sighter to transmit a secure message to the owner.

Example 12

The method of example 11, wherein the generating the beacon packet comprises the beacon including data in the beacon packet.

Example 13

The method of example 12, wherein the data is data from a sensor included in the beacon.

Example 14

The method of any one of examples 11 to 13, further comprising the beacon:
generating an authentication tag for the beacon packet; and
wherein the generating the beacon packet comprises the beacon including the authentication tag in the beacon packet.

Example 15

A method of securely communicating a message from a beacon to an owner, the method comprising the beacon:
generating an exponentiation of a random value that is shared between the beacon and the owner;
storing the random value and the exponentiation of the random value;
generating a multiplicative inverse of the random value;
storing the multiplicative inverse of the random value;
generating a proxy value using the stored value of the multiplicative inverse and a time value;
generating a beacon packet including the exponentiation of the random value and the proxy value; and
transmitting the beacon packet, the transmitting being effective to cause a sighter to generate an end-to-end encrypted ephemeral identifier (E2EE-EID) that is usable to transmit a secure message to the owner.

Example 16

The method of example 15, wherein the generating the beacon packet comprises the beacon including data in the beacon packet.

Example 17

The method of example 16, wherein the data is data from a sensor included in the beacon.

Example 18

The method of any one of examples 15 to 17, further comprising the beacon:
generating an authentication tag for the beacon packet; and
wherein the generating the beacon packet comprises the beacon including the authentication tag in the beacon packet.

Example 19

An electronic device comprising:
a wireless transceiver;
a processor; and
instructions that are executable by the processor to configure the electronic device to perform the method of any one of examples 1 to 18.

Example 20

A computer-readable storage media comprising instructions that, responsive to execution by a processor, cause a method as recited in any one of examples 1 to 18 to be performed.

Although embodiments of a three-party cryptographic handshake protocol have been described in language specific to features and/or methods, the subject of the appended claims is not necessarily limited to the specific features or methods described. Rather, the specific features and methods are disclosed as example implementations of the three-party cryptographic handshake protocol, and other equivalent features and methods are intended to be within the scope of the appended claims. Further, various different embodiments are described, and it is to be appreciated that each described embodiment can be implemented independently or in connection with one or more other described embodiments.

The invention claimed is:

1. A method of securely communicating a message from a sighter to an owner, the method comprising:
receiving, from a beacon, a packet including an end-to-end encrypted ephemeral identifier (E2EE-EID);
generating the message for the owner;
selecting a private key;
computing an exchanged key using the private key and the E2EE-EID;
extracting, from the exchanged key, a common symmetric key;
encrypting the message using the common symmetric key; and
transmitting the encrypted message to the owner.

2. The method of claim 1, further comprising the sighter:
receiving data from the beacon in the packet; and
wherein the generating the message for the owner comprises the sighter including the received data in the message for the owner.

3. The method of claim 1, wherein the generating the message for the owner comprises the sighter:
including data from the sighter in the message.

4. The method of claim 3, wherein the data from the sighter includes a location of the sighter when the sighter received the packet from the beacon.

5. The method of claim 1, further comprising the sighter:
receiving, from the beacon and in the packet, an authentication tag for the packet; and
wherein the generating the message for the owner comprises the sighter including the authentication tag in the message for the owner.

6. A method of securely communicating a message from a sighter to an owner, the method comprising:
receiving, from a beacon, a packet including an exponentiation of a random value and a proxy value;
generating an end-to-end encrypted ephemeral identifier (E2EE-EID) from the exponentiation of the random value and the proxy value;
generating the message for the owner;
selecting a private key;
computing an exchanged key using the private key and the E2EE-EID;
extracting, from the exchanged key, a common symmetric key;
encrypting the message using the common symmetric key; and
transmitting the encrypted message to the owner.

7. The method of claim 6, further comprising the sighter:
receiving data from the beacon in the packet; and
wherein the generating the message for the owner comprises the sighter including the received data in the message for the owner.

8. The method of claim 6, wherein the generating the message for the owner comprises the sighter:
including data from the sighter in the message.

9. The method of claim 8, wherein the data from the sighter includes a location of the sighter when the sighter received the packet from the beacon.

10. The method of claim 6, further comprising the sighter:
receiving, from the beacon and in the packet, an authentication tag for the packet; and
wherein the generating the message for the owner comprises the sighter including the authentication tag in the message for the owner.

11. A method of securely communicating a message from a beacon to an owner, the method comprising the beacon:
determining a common key that is shared between the beacon and the owner;
generating an end-to-end encrypted ephemeral identifier (E2EE-EID) using the common key and a time value;
generating a beacon packet including the E2EE-EID; and
transmitting the beacon packet, the beacon packet being usable by a sighter to transmit a secure message to the owner.

12. The method of claim 11, wherein the generating the beacon packet comprises the beacon including data in the beacon packet.

13. The method of claim 12, wherein the data is data from a sensor included in the beacon.

14. The method of claim 11, further comprising the beacon:
generating an authentication tag for the beacon packet; and
wherein the generating the beacon packet comprises the beacon including the authentication tag in the beacon packet.

15. A method of securely communicating a message from a beacon to an owner, the method comprising the beacon:

generating an exponentiation of a random value that is shared between the beacon and the owner;

storing the random value and the exponentiation of the random value;

generating a multiplicative inverse of the random value;

storing the multiplicative inverse of the random value;

generating a proxy value using the stored value of the multiplicative inverse and a time value;

generating a beacon packet including the exponentiation of the random value and the proxy value; and transmitting the beacon packet, the transmitting being effective to cause a sighter to generate an end-to-end encrypted ephemeral identifier (E2EE-EID) that is usable to transmit a secure message to the owner.

16. The method of claim 15, wherein the generating the beacon packet comprises the beacon including data in the beacon packet.

17. The method of claim 16, wherein the data is data from a sensor included in the beacon.

18. The method of claim 15, further comprising the beacon:

generating an authentication tag for the beacon packet; and wherein the generating the beacon packet comprises the beacon including the authentication tag in the beacon packet.

19. An electronic device comprising:

a wireless transceiver;

a processor; and instructions that are executable by the processor to configure the electronic device to:

receive, from a beacon, a packet including an end-to-end encrypted ephemeral identifier (E2EE-EID);

generate a message for a owner;

select a private key;

compute an exchanged key using the private key and the E2EE-EID;

extract, from the exchanged key, a common symmetric key;

encrypt the message using the common symmetric key; and transmit the encrypted message to the owner.

20. The electronic device of claim 19, the instructions further executable to configure the electronic device to:

receive data from the beacon in the packet; and wherein the generation of the message for the owner comprises the electronic device including the received data in the message for the owner.

* * * * *